US007590634B2

(12) United States Patent  
Crockett et al.

(10) Patent No.: US 7,590,634 B2
(45) Date of Patent: Sep. 15, 2009

(54) DETECTION OF INACCESSIBLE RESOURCES

(75) Inventors: Sterling John Crockett, Bothell, WA (US); Shiu-Kai Lee, Bellevue, WA (US); William James Griffin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 11/297,962

(22) Filed: Dec. 9, 2005

(65) Prior Publication Data

US 2007/0136298 A1      Jun. 14, 2007

(51) Int. Cl.
*G06F 17/30* (2006.01)

(52) U.S. Cl. .................... 707/10; 707/1; 707/104.1; 715/209; 715/229

(58) Field of Classification Search ........................ None
See application file for complete search history.

(56) References Cited

U.S. PATENT DOCUMENTS

| | | | | |
|---|---|---|---|---|
| 5,995,099 | A | 11/1999 | Hortsmann | 345/335 |
| 6,341,310 | B1 | 1/2002 | Leshem et al. | 709/223 |
| 6,549,944 | B1 | 4/2003 | Weinberg et al. | 709/224 |
| 6,598,051 | B1 | 7/2003 | Wiener et al. | 707/100 |
| 6,631,496 | B1 | 10/2003 | Li et al. | 715/501.1 |
| 6,658,423 | B1 | 12/2003 | Pugh et al. | 707/102 |
| 6,665,838 | B1 | 12/2003 | Brown et al. | 715/501.1 |
| 7,386,786 | B2 * | 6/2008 | Davis et al. | 715/234 |
| 2001/0000541 | A1 * | 4/2001 | Schreiber et al. | 713/100 |
| 2003/0231216 | A1 * | 12/2003 | McBrearty et al. | 345/855 |
| 2004/0054930 | A1 * | 3/2004 | Walker et al. | 713/202 |
| 2004/0205076 | A1 * | 10/2004 | Huang et al. | 707/100 |
| 2005/0120060 | A1 | 6/2005 | Meng | 707/202 |
| 2005/0120292 | A1 * | 6/2005 | Suzuki | 715/501.1 |
| 2005/0216507 | A1 * | 9/2005 | Wright | 707/104.1 |
| 2006/0101341 | A1 * | 5/2006 | Kelly et al. | 715/738 |
| 2007/0093243 | A1 * | 4/2007 | Kapadekar et al. | 455/419 |

FOREIGN PATENT DOCUMENTS

| | | |
|---|---|---|
| GB | 2 372 340 A | 8/2002 |
| WO | WO 01/52078 A1 | 7/2001 |

* cited by examiner

*Primary Examiner*—Don Wong
*Assistant Examiner*—Belinda Xue
(74) *Attorney, Agent, or Firm*—Merchant & Gould; Ryan T. Grace

(57) ABSTRACT

Detection and indication of inaccessible resources associated with a webpage is disclosed. Dependent resource identifiers are generated. The identifiers facilitate the query of a resource database to ascertain the status of dependent resources. The status of the dependent resources facilitates the marking of the resources in the webpage, and/or the generation of a report that indicates the status of dependent resources. An interface is provided so an author may easily ascertain the status of a dependent resource before publication of a webpage. In this manner, an author may easily and efficiently ascertain dependent resources that are subject to security right issues and/or versioning issues before publishing a webpage.

16 Claims, 8 Drawing Sheets

DETECTION OF INACCESSIBLE RESOURCES

BACKGROUND

During webpage authoring, an author may implement one or more resources that affect the viewing of a web page. Dependent resources may be subject to versioning where one or more versions of a dependent resource exist. For example, a dependent resource may include a major version, which may be accessible to a user. A dependent resource may also include a minor version, which may be accessible to authors. Also, a dependent resource may include a checked-out version, which may be accessible to an author who checks-out a version of a dependent resource.

Along with versioning, web pages and dependent resources may also be subject to security rights. For example, an author may have security rights to access a particular dependent resource; however, a user or set of users may not have this right once the webpage is published. In such a situation, the user does not have access to the dependent resource. Before publishing a webpage, a webpage author cannot easily and efficiently ascertain whether any of the resources, which the webpage is dependent on, have versioning issues and/or security issues.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Aspects of the disclosure include detection and indication of inaccessible resources associated with a webpage. Dependent resource identifiers are generated. The identifiers facilitate the query of a resource database to ascertain the status of dependent resources. The status of the dependent resources facilitates the marking of the resources in the webpage, and/or the generation of a report that indicates the status of dependent resources. An interface is provided so an author may easily ascertain the status of a dependent resource before publication of a webpage. In this manner, an author may easily and efficiently ascertain dependent resources that are subject to security right issues associated with readers and/or versioning issues before publishing a webpage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
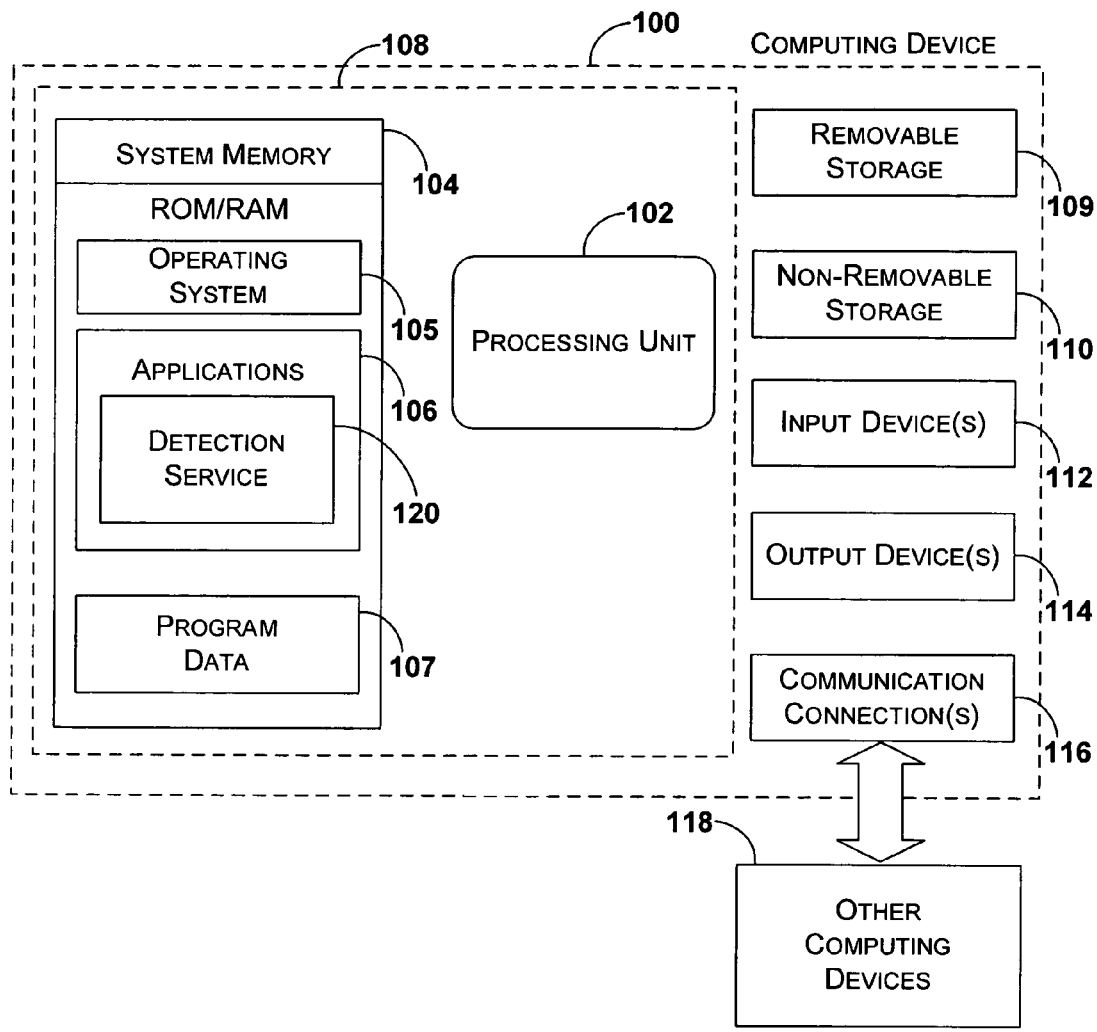
FIG. 1 illustrates an exemplary computing device that may be used in one aspect of the present invention.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments for Detection of Inaccessible Resources

During webpage authoring, an author may implement one or more dependent resources that affect the viewing of a web page. Such dependent resources may include images, image tags, background images, links, content fragments, script, resources with an SRC tag, resources that correspond to an element on a server, and/or any type of resource the effects the visibility of a webpage.

Dependent resources may be subject to versioning where one or more versions of a dependent resource exist. For example, a dependent resource may include a major version, which may be accessible to a user. A dependent resource may also include a minor version, which may be accessible to authors. Also, a dependent resource may include a checked-out version, which may be accessible to an author who checks-out a version of a dependent resource.

Along with versioning, web pages and dependent resources may also be subject to security rights. For example, an author may have security rights to access a particular dependent resource; however, a user or set of users may not have this right once the webpage is published. In such a situation, the user does not have access to the dependent resource.

Before an author publishes a webpage, the author needs to know the accessibility of dependent resources. In the situation where an author is integrating a dependent resource that is not published, the author needs to know the same because the user may only be able to view the published version (provided the user has the necessary security rights). Also, where multiple versions of a dependent resource exist, the author needs to know the same so the most appropriate version may be integrated before publishing. Moreover, where a dependent resource is subject to security rights, the author needs to know the same so the author may ascertain whether a user is able to access dependent resources associated with the webpage.

A dependent resource may include several types of status that affect accessibility to the end user once a website is published. For example, a dependent resource may belong on a server but not exist. This situation arises when the dependent resource is referred to but has not been created. In such a situation, neither the author nor the user has access to the dependent resource. As another example, a dependent resource may not be published. In such a situation, the author has access to the dependent resource but the user does not. In yet another example, a dependent resource may include only a major version. In such a situation, both the author and the user have access to the dependent resource (assuming security rights are fulfilled). In still another example, a dependent resource may include a major and a minor version. In such a situation, the author has access to the minor version and the user has access to the major version (assuming security rights are fulfilled). In yet another situation, a dependent resource may include a major version, a minor version, and a checked-out version. In such a situation, the check-out author has access to the checked-out version, other authors have access to the minor version, and users have access to the major version (assuming security rights exist).

Along with versioning, a webpage and dependent resources may include one or more security rights. Security rights may include rights to the webpage and rights to all the dependent resources. In such a situation, a user has access to the webpage and all the dependent resources. Security rights may also include rights to the webpage but only rights for some users to access the dependent resources. In such a situation, all the users may have access to the webpage but only a portion of the users has access to the dependent resources. In yet another situation, security rights may include rights to the webpage but no users have rights to access the dependent resources. In such a situation, all users have access to the webpage, but no users have access to the dependent resources associated with the webpage.

Embodiments of the disclosure relate to detection and indication of inaccessible resources. Aspects include providing an interface so an author may easily ascertain the status of a dependent resource before publication of a webpage based on credentials of the author. As a succinct summation of a few aspects of the disclosure, dependent resource identifiers are generated. The identifiers facilitate the query of a resource database to ascertain the status of dependent resources. The status of the dependent resources facilitates the marking of the resources in the webpage, and/or the generation of a report that indicates the status of dependent resources. In this manner, an author may easily and efficiently ascertain status of dependent resources that are subject to security right issues and/or versioning issues before publishing a webpage.

Figure 3:
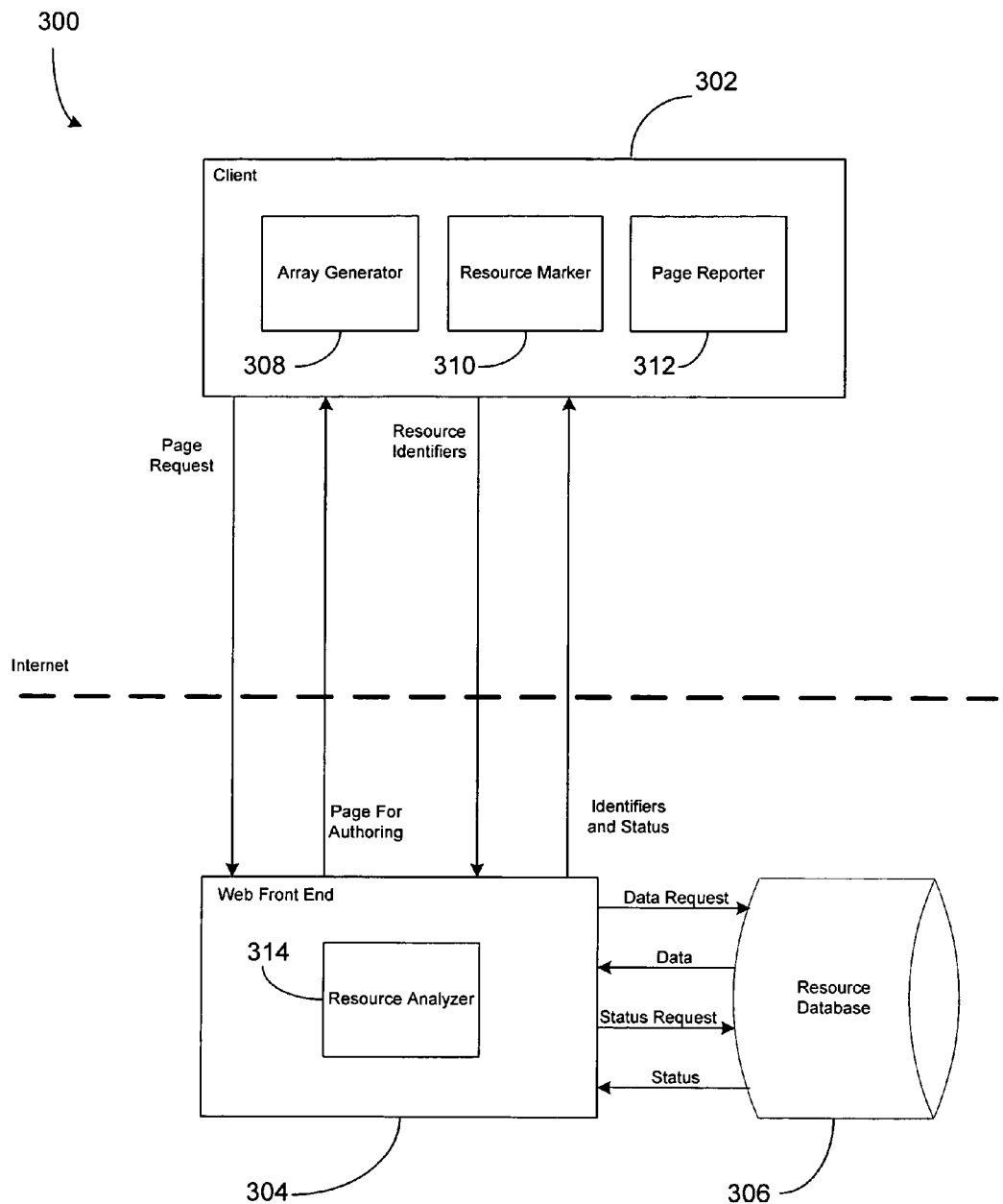
FIG. 3 represents one exemplary system overview for detection of inaccessible resources.

FIG. 3 represents one exemplary system overview 300 for detecting inaccessible resources. Client 302, web front end 304, and resource database 306 represent a general modular overview of some aspects of the disclosure. Client 302 and web front end 304 may include the same modular elements being represented during different processes. Client 302 and web front end 304 may be integrated as a combination of software and hardware elements, an operating system or any combination thereof. Hardware, databases, software or applications referenced herein may be integrated as a single element or include various elements in communication with one another. FIG. 3 is but one exemplary system and not meant for limiting the functionality disclosed herein to a particular device, a single device or a plurality of devices.

Software and/or hardware elements are depicted herein for explanatory purposes only and not for limiting the configuration to multiple elements or a single element performing several functions. Elements of client 302 may reside on a single computing device or a plurality of computing devices in communication with one another. Likewise, elements of web front end 304 may reside on a single server or a plurality of servers in communication with one another. Aspects of client 302 and web front end 304 may include computing device 100 as exemplified in FIG. 1 and/or mobile computing device 200 as exemplified in FIG. 2.

In FIG. 3, client 302 may include array generator 308, resource marker 310 and page reporter 312. Reference numbers 308-312 may include separate programs, separate databases, separate computing devices and separate hardware. Reference numbers 308-312 may also include multiple programs, databases, computing devices, hardware or any combination thereof. Web front end 304 may include resource analyzer 314 and an associated resource database 306. Reference numbers 314 and 306 may include separate programs, separate databases, separate computing devices and separate hardware. Reference numbers 314 and 306 may also include multiple programs, databases, computing devices, hardware or any combination thereof.

In FIG. 3, client 302 may be associated with array generator 308. Array generator 308 may include code that iterates through every resource on a webpage to identify resources that are dependent. Array generator 308 may include a list generator, set generator and/or any other type of generator that identifies dependent resources. In one aspect, a dependent resource includes any resource that may be governed by versioning and/or security. In another aspect a dependent resource may include images, image tags, background images, links, content fragments, script, resources with an SRC tag, resources that correspond to an element on a server, and/or any type of resource that affects the visibility of a webpage. Array generator 308 may function to decompose the Hyper Text Mark-up Language ("HTML") of a webpage into a hierarchy. Array generator 308 may traverse the hierarchy to identify dependent resources. An identifier and/or a Universal Resource Locator ("URL") may be included in the array to identify the dependent resource.

Client 302 may also include resource marker 310. Resource marker 310 may include code or processes that mark a webpage according to the status of the dependent resource. Such marking may include an outline, a highlight, a shading, borders, tags, ALT text, a style, and/or any other marking type for identifying an object. Client 302 may also include page reporter 312. Page reporter 312 may include code or process for generating a report that indicates the status of one or more dependent resources. In one aspect page reporter 312 may include a separate web page that includes the status of one or more dependent resources.

Web front end 304 may be associated with resource analyzer 314. Even though resource analyzer 314 is depicted as being directly associated with web front end 304, resource analyzer 314 may be associated with a separate server (e.g. farm configuration). Resource analyzer 314 may be associated with code or process for receiving a dependent resource array. Resource analyzer 314 may iterate through the dependent resource identifiers to determine whether the identifiers are recognized. Where the identifiers are not recognized, resource analyzer 314 may indicate so in an array to be sent to client 302. When resource analyzer 314 recognizes the identifiers and the dependent resources are in an associated database, resource analyzer 314 may obtain status data and indicate the status in an array to be sent to client 302. In another aspect, resource analyzer 314 may recognize identifiers associated with the dependent resource array; however, the identifiers may indicate a resources database that is not associated with web front end 304. In one aspect, resource analyzer 314 queries the unassociated database to determine whether the resource exists. When the resource does exist, resource analyzer 314 indicates that the resource exists in an array to be sent to client 302. Resource analyzer 314 may use other query techniques to determine status elements of dependent resources that are unassociated with the server.

Web front end 304 may be associated with resource database 306. In one aspect resource database 306 is an associated resource database. In another aspect, resource database 306 is an unassociated database. Resource database 306 may include the one or more resources and status information regarding the one or more resources. The status information may include version information for a resource and/or security data regarding one or more resources. In one aspect, resource database 306 maintains dependent resources that may be referenced in a webpage. In another aspect, resource database 306 includes a plurality of databases.

In general and as one example of the functionality of elements of system 300, client 302 transmits a webpage request to web front end 304. Web front end 304 transmits the webpage to the client for authoring. Array generator 308 identifies the dependent resources associated with the web page. The dependent resource identifiers are transmitted to web front end 304 where resource analyzer 314 determines whether status data is obtainable. Where status data is obtainable, resource analyzer 314 indicates the status for the identifiers of the dependent resources. The identifiers and status are transmitted to client 302. In one aspect, resource marker 310 marks dependent resources according to status. In another aspect, page report 312 generates a report that identifies the status of the dependent resources included in a webpage. In this manner, an author may easily and efficiently ascertain the status of dependent resources that are subject to security right issues and/or versioning issues before publishing a webpage.

Figure 4:
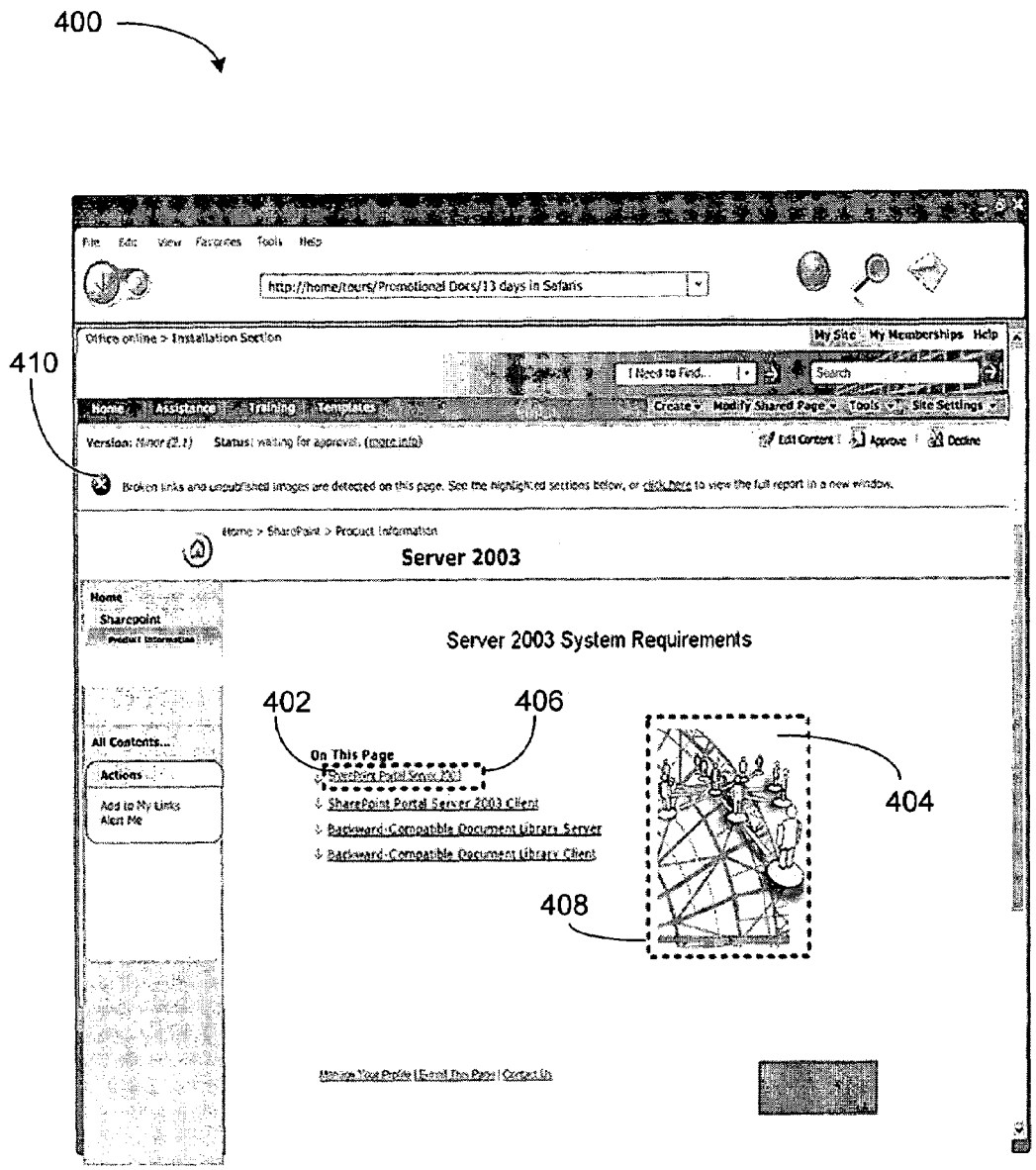
FIG. 4 is an exemplary web page representing an exemplary embodiment for marking a web page.

FIG. 4 is an exemplary web page representing an exemplary embodiment for marking the web page 400. Web page 400 may include dependent resources 402 and 404. For example, in FIG. 4, dependent resource 402 includes a link and dependent resource 404 includes an image. Status marker 406 and status marker 408 indicate the status of dependent resources 402 and 404, respectively. Even though status markers 406 and 408 are depicted as dashed lines, status markers 406 and 408 may include any type of marker for marking an object. In one aspect, web page 400 also includes summary information 410. Summary information 410 may include a status summary of the page. Summary information 410 may also include a link for accessing a page report.

Figure 5:
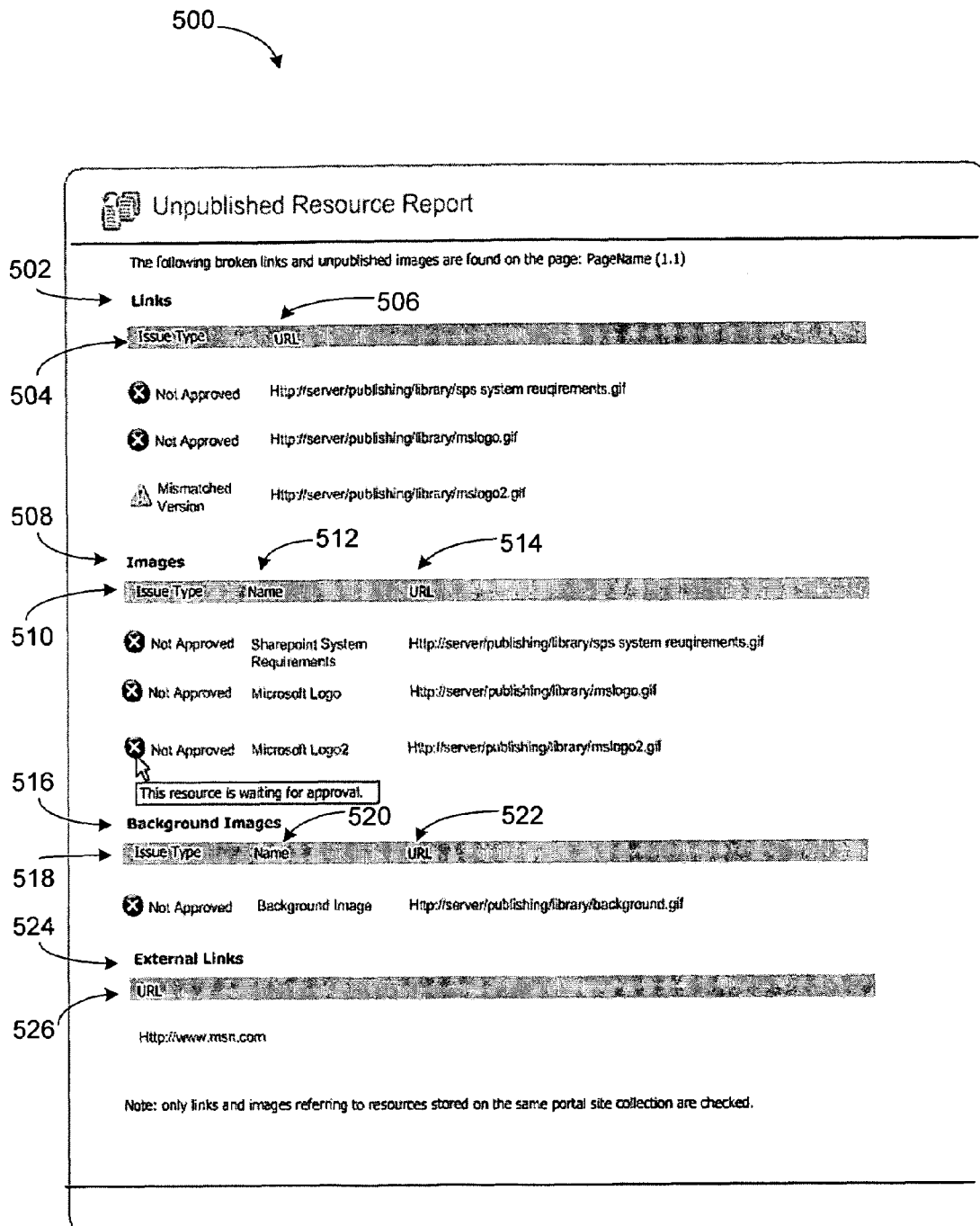
FIG. 5 is an exemplary web page representing an exemplary embodiment for a page report.

FIG. 5 is an exemplary web page representing an exemplary embodiment for a page report 500. Page report 500 may include links section 502. Links section 502 may include status section 504 and identifier section 506. Page report 500 may also include images section 508. Images section 508 may include status section 510, name section 512 and identifier section 514. Page report 500 may further include background images section 516. Background images section 516 may include status section 518, name section 520, and identifier section 522. Page report 500 may further include external links section 524. External links section 524 may include an identifier section 526. Succinctly stated, page report 500 may include any elements for facilitating the identification of status of dependent resources.

Figure 6:
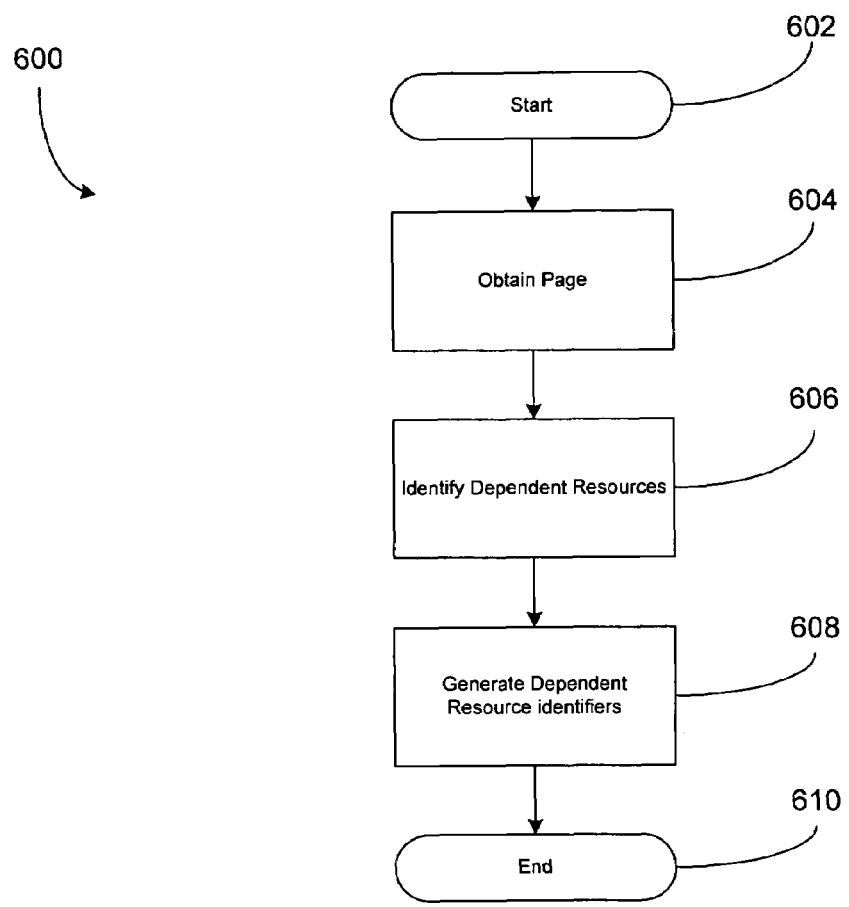
FIG. 6 is an operational flow diagram representing an exemplary embodiment for generating a dependent resource array.

FIG. 6 is an operational flow diagram representing an exemplary embodiment for generating dependent resource identifiers. Operational flow 600 starts at start operation 602 and continues to operation 604, where a page is obtained. In one aspect, a page is obtained via a call from a client. The page is received by the client where the page is opened for authoring.

Operational flow 600 continues to operation 606 where dependent resources are identified. Dependent resources may include any resource that may be governed by versioning and/or security. In another aspect, a dependent resource may include images, image tags, background images, links, content fragments, script, resources with an SRC tag, resources that correspond to an element on a server, and/or any type of resource that effects the visibility of a webpage. In another aspect, dependent resources are resources that are imported to the page after the page has been rendered. Identifying dependent resources may further include decomposing HTML into a hierarchy and traversing the hierarchy to identify external references.

Operational flow 600 continues to operation 608 where a dependent resource array, list or set is generated. Generation of the dependent resource array may include an array of identifiers and/or URLs for the dependent resources. Operational flow 600 then continues to end operation 610.

Figure 7:
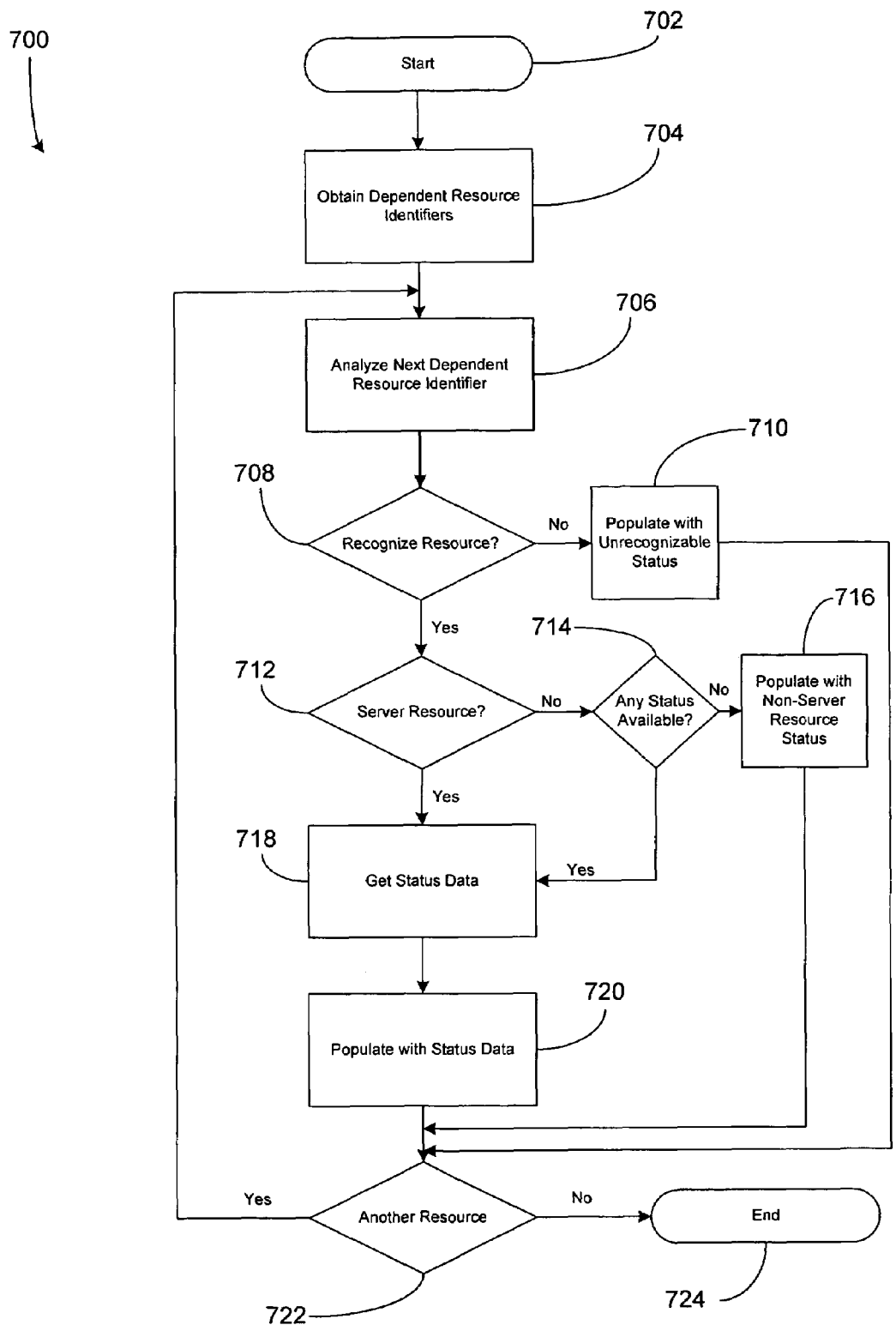
FIG. 7 is an operational flow diagram representing an exemplary embodiment for obtaining status data for dependent resources.

FIG. 7 is an operational flow diagram representing an exemplary embodiment for obtaining status data for dependent resources of an array. Operational flow 700 begins at start operation 702 and flows to operation 704 where dependent resources are obtained. In one aspect, the dependent resources include a set of identifiers and/or URLs for one or more dependent resources. At operation 706, the identifier for the next dependent resource is analyzed.

Operational flow 700 continues to decision operation 708 where it is determined whether the next dependent resource identifier is recognized. Where the next dependent resource identifier is not recognized, operational flow 700 continues to operation 710 where an array is populated with the dependent resource identifier along with the status that the next identifier is not recognized. Operational flow 700 then continues to decision operation 722 as more fully set forth below.

Returning to decision operation 708, where the dependent resource identifier is recognized, operational flow 700 continues to decision operation 712. At decision operation 712 it is determined whether the dependent resource identifier is associated with a database that is associated with the server. Where such an association does not exist, operational flow 700 continues to decision operation 714, where it is determined whether any status is available. Even though the identifier indicates a dependent resource that is not associated with the server, operational flow 700 may include processes for determining status about the dependent resource. In such a situation, operational flow continues to operation 718 where status data is retrieved. In the case where the dependent resource is not associated with the server, status data that the resource exists may be obtained. In other situations, the server may include methods and processes to obtain version and security data regarding a dependent resource that is not associated with the server.

Returning to decision operation 714, where no status data is available, operational flow 700 continues to operation 716 where an array is populated with the dependent resource identifier along with the status that the identifier refers to a non-server resource and status is unavailable. Operational flow 700 then continues to decision operation 722 as more fully set forth below.

Returning to decision operation 712, where it is determined that the dependent resource identifier is associated with a database that is associated with the server, operational flow 700 continues to operation 718. At operation 718, the status of the dependent resource is obtained. The status may include versioning data and/or security data. The status data may include several types of indicators of the status of a dependent resource. For example, a dependent resource may belong on a server but not exist. As another example, the status data may include the version of the dependent resource. Along with versioning, status may also include security rights. Security rights may include rights to the dependent resource. Operational flow 700 continues to operation 720 where an array, set or list is populated with the dependent resource identifier along with the status of the dependent resource. In one aspect the array includes the dependent resource identifier, an indication of the status of the resource, and an indication of the security associated with the resource.

Operational flow 700 continues to decision operation 722 where it is determined whether another dependent resource identifier exists for analysis. If so, operational flow 700 loops back to operation 706. If not, operational flow 700 flows to end operation 724.

Figure 8:
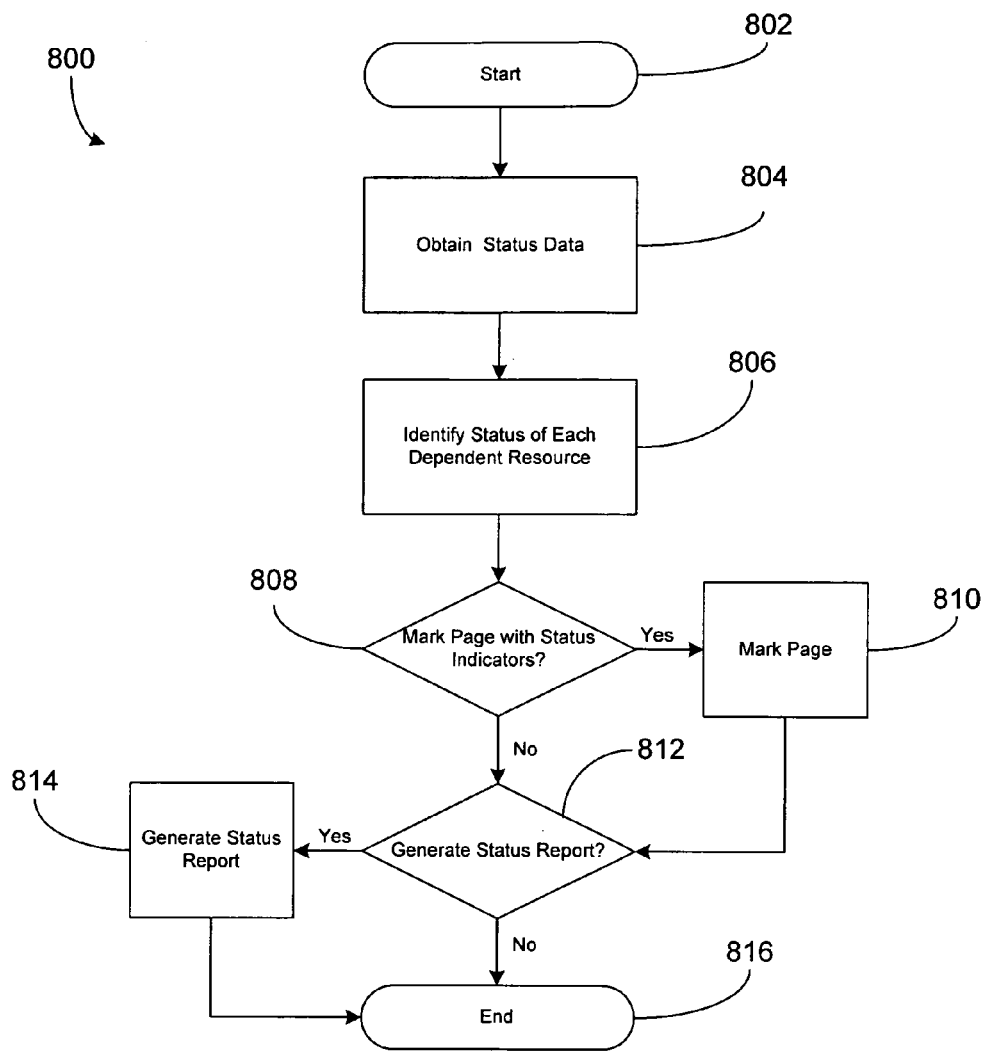
FIG. 8 is an operational flow diagram representing an exemplary embodiment for indicating the status of a resource.

FIG. 8 is an operational flow diagram representing an exemplary embodiment for indicating the status of a resource. Operational flow 800 begins at start block 802 and continues to operation 804. Operation 804 includes obtaining identifiers associated with status data. One aspect includes an array having dependent resource identifiers and status data associated with each dependent resource identifier. In one aspect, the status data includes versioning data and security rights data.

Operational flow 800 continues to operation 806 where the status of each dependent resource is identified. The status data may indicate several different states of a dependent resource. For example, the status data may indicate that a dependent resource belongs on the server but does not exist. As another example, the status data may indicate that a dependent resource is not published. In yet another example, the status data may indicate that a dependent resource includes a major version. In still another example, the status data may make evident that a dependent resource includes a major and a minor version. In yet another situation, the status data may make evident that a dependent resource includes a major version, a minor version, and a checked-out version.

Along with versioning, status data may indicate security rights of a webpage and dependent resources. Security rights may indicate that all users have access to the dependent resource. Security rights may also indicate that some users have access to the dependent resource. In yet another situation, security rights may indicate that no users have rights to the dependent resources.

Operational flow 800 continues to decision operation 808 where it is decided whether to mark the page with status indicators. Operation 808 may include a preset function, an automatic function, a user input, and/or any other manner of making a decision in a computing environment. Where it is decided to mark the page, operational flow 800 continues to operation 810 where the page is marked. Aspects may include marking the page as described above in conjunction with FIGS. 3 and 4.

Where it is decided not to mark the page, operational flow continues to decision operation 812. At decision operation 812, it is decided whether to generate a status report. Operation 812 may include a preset function, an automatic function, a user input, and/or any other manner of making a decision in a computing environment. Where it is decided to generate the report, operational flow 800 continues to operation 814 where the report is generated. Aspects may include generating a report as described above in conjunction with FIGS. 3 and 5. Operational flow 800 continues to end operation 816. At decision operation 812, where it is decided not to generate a status report, operational flow 800 continues to end operation 816.

As the disclosure herein indicates, an author may easily and efficiently ascertain the status of dependent resources that are subject to security right issues and/or versioning issues before publishing a webpage.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for detection service. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
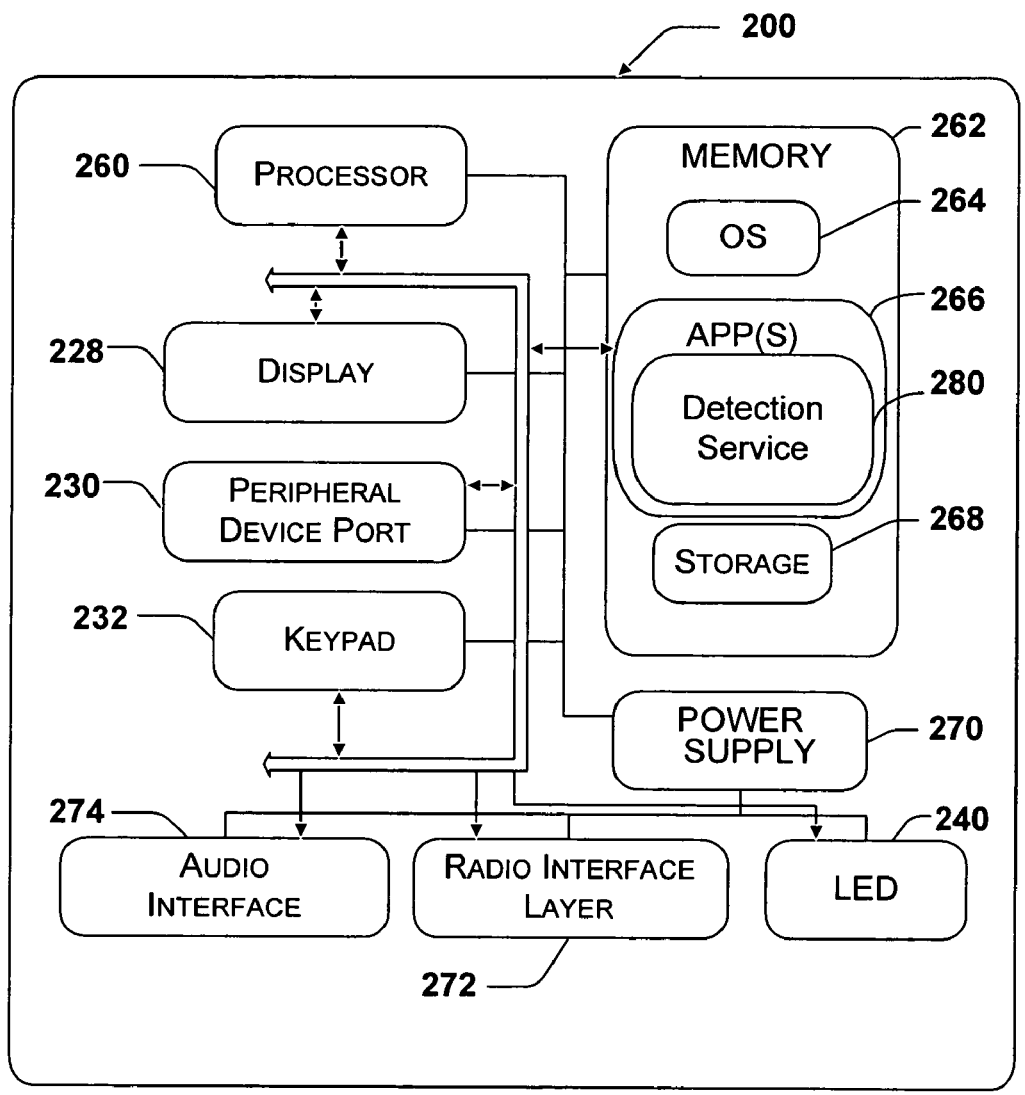
FIG. 2 illustrates an exemplary mobile device that may be used in one aspect of the present invention.

FIG. 2 illustrates a mobile computing device 200 that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for detection service.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for detecting inaccessible resources in an unpublished webpage, comprising:
  prior to publishing the unpublished webpage:
    providing the unpublished webpage on an author client device, wherein the unpublished webpage includes at least one dependent resource identifier that identifies a dependent resource included in the unpublished webpage, wherein the dependent resource identifier identifies at least one member of a group comprising: a dependent resource governed by versioning and a dependent resource governed by security;
    decomposing, by a computer processor, mark-up language associated with the unpublished webpage to identify the at least one dependent resource identifier that identifies a dependent resource included in the unpublished webpage;
    in response to decomposing, generating a dependent resource array that includes the at least one dependent resource identifier that identifies a dependent resource included in the unpublished webpage;
    receiving the dependent resource array on a resource analyzer, wherein the resource analyzer is associated with at least one database storing dependent resources identified in the unpublished webpage;
    querying the database with the dependent resource identifier to determine a status of the dependent resource identified in the unpublished webpage by the dependent resource identifier;
    indicating a status identifier of the dependent resource in the dependent resource array in association with the dependent resource identifier identified in the unpublished webpage;
    sending the dependent resource array with the indicated status identifier of the dependent resource identifier to the author client device; and
    graphically conveying the status on the author client device in association with the at least one dependent resource identified in the unpublished webpage.

2. The computer-implemented method of claim 1, wherein the dependent resource identifier is an Uniform Resource Locators.

3. The computer-implemented method of claim 1, wherein the status identifier includes a versioning indication.

4. The computer-implemented method of claim 3, wherein the versioning indication includes at least one member of a group comprising: an indication of an unknown dependent resource, an indication that a dependent resource exists, an indication of a version of a dependent resource; and an indication that a dependent resource includes a major version.

5. The computer-implemented method of claim 1, wherein the status identifier includes a security indication.

6. The computer-implemented method of claim 5, wherein the security indication includes at least one member of a group comprising: an indication of full access to a dependent resource, an indication of partial access to a dependent resource, and an indication of no access to a dependent resource.

7. The computer-implemented method of claim 1, wherein the graphically conveying the status on the author client device includes marking the at least one dependent resource identified in the unpublished webpage.

8. The computer-implemented method of claim 7, wherein the marker includes at least one member of a group comprising: an outline, a highlight, a shading, a border, a tag, ALT text, and a style.

9. The computer-implemented method of claim 1, wherein the graphically conveying the status on the author client device includes a report page.

10. The computer-implemented method of claim 9, wherein the report page is selectively instantiated from the unpublished webpage.

11. A computer-readable storage medium having computer executable instructions for detecting inaccessible resources in an unpublished webpage, comprising:
prior to publishing the unpublished webpage:
providing an unpublished webpage on an author client device, wherein the unpublished webpage includes at least one dependent resource identifier that identifies a dependent resource included in the unpublished webpage, wherein the dependent resource identifier identifies at least one member of a group comprising: a dependent resource governed by versioning and a dependent resource governed by security;
decomposing mark-up language associated with the unpublished webpage to identify the at least one dependent resource identifier that identifies a dependent resource included in the unpublished webpage;
in response to decomposing, generating a dependent resource array that includes the at least one dependent resource identifier that identifies a dependent resource included in the unpublished webpage; receiving the dependent resource array on a resource analyzer, wherein the resource analyzer is associated with at least one database storing dependent resources identified in the unpublished webpage;
querying the database with the dependent resource identifier to determine a status of the dependent resource identified in the unpublished webpage by the dependent resource identifier;
indicating a status identifier of the dependent resource identified in the unpublished webpage in the dependent resource array in association with the dependent resource identifier;
sending the dependent resource array with the indicated status identifier of the dependent resource identifier to the author client device; and
graphically conveying the status on the author client device in association with the at least one dependent resource identified in the unpublished webpage.

12. The computer-readable storage medium of claim 11, wherein the status includes at least one member of a group comprising: an indication of an unknown dependent resource, an indication that a dependent resource exists, an indication of a version of a dependent resource; an indication that a dependent resource includes a major version, an indication of full access to a dependent resource, an indication of partial access to a dependent resource, and an indication of no access to a dependent resource.

13. The computer-readable storage medium of claim 11, wherein the graphically conveying the status on the author client device includes at least one member of a group comprising: an outline, a highlight, a shading, a border, a tag, ALT text, and a style.

14. The computer-readable storage medium of claim 11, wherein the unpublished webpage further includes a link for generating a report page, wherein the report page indicates the status of the at least one dependent resource identified in the unpublished webpage.

15. A system for detecting inaccessible resources in an unpublished webpage, the system comprising;
a processor; and
a memory having computer executable instructions stored thereon, wherein the computer executable instructions are configured for:
prior to publishing the unpublished webpage:
providing an unpublished webpage on an author client device, wherein the unpublished webpage includes at least one dependent resource identifier that identifies a dependent resource included in the unpublished webpage, wherein the dependent resource identifier identifies at least one member of a group comprising: a dependent resource governed by versioning and a dependent resource governed by security;
decomposing mark-up language associated with the unpublished webpage to identify at least one dependent resource identifier of the at least one dependent resource that identifies a dependent resource included in the unpublished webpage;
in response to decomposing, generating a dependent resource array that includes the at least one dependent resource identifier that identifies a dependent resource included in the unpublished webpage;
receiving the dependent resource array on a resource analyzer, wherein the resource analyzer is associated with at least one database storing dependent resources identified in the unpublished webpage;
querying the database with the dependent resource identifier to determine a status of the dependent resource identified in the unpublished webpage by the dependent resource identifier;
indicating a status identifier of the dependent resource identified in the unpublished webpage in the dependent resource array in association with the dependent resource identifier;
sending the dependent resource array with the indicated status identifier of the dependent resource identifier to the author client device; and
graphically conveying the status on the author client device in association with the at least one dependent resource identified in the unpublished webpage.

16. The system of claim 15, wherein graphically conveying the status on the author client device includes at least one member of a group comprising: marking the dependent resource identified in the unpublished webpage and a report page.

* * * * *